United States Patent [19]

Adachi et al.

[11] Patent Number: 4,624,508
[45] Date of Patent: Nov. 25, 1986

[54] REGULATOR VALVE FOR HYDRAULIC ANTI-SKID APPARATUS

[75] Inventors: Yoshiharu Adachi; Asao Kozakai, both of Kariya; Shingo Watanabe, Toyota; Nobuyasu Nakanishi, Toyota; Hiroyuki Oka, Toyota; Fumio Nakagawa, Toyota, all of Japan

[73] Assignees: Aisin Seiki Kabushiki Kaisha, Kariya; Toyota Jidosha Kabushiki Kaisha, Toyota, both of Japan

[21] Appl. No.: 637,719

[22] Filed: Aug. 6, 1984

[30] Foreign Application Priority Data

Aug. 4, 1983 [JP] Japan ............................ 58-121551[U]

[51] Int. Cl.[4] ............................................. B60T 8/02
[52] U.S. Cl. .................................. 303/116; 303/115; 251/47
[58] Field of Search ............... 303/115, 116, 117, 118, 303/119, 10; 137/599; 251/47, 52

[56] References Cited

U.S. PATENT DOCUMENTS

| 2,757,643 | 8/1956 | Hunter | 251/47 |
| 3,514,162 | 4/1970 | Erlebach et al. | 303/116 |
| 3,922,021 | 11/1975 | Every | 303/116 |
| 4,072,366 | 2/1978 | Kondo | 303/116 |
| 4,264,111 | 4/1981 | Shimizu et al. | 303/116 |
| 4,492,414 | 1/1985 | Kozakai et al. | 303/115 |

Primary Examiner—Bruce H. Stoner, Jr.
Assistant Examiner—Alvin Oberley
Attorney, Agent, or Firm—Oblon, Fisher, Spivak, McClelland & Maier

[57] ABSTRACT

A regulator valve for a hydraulic anti-skid apparatus and which includes a housing provided with a first inlet port for connection to a fluid pump and the anti-skid apparatus, a second inlet port for connection to a master cylinder, and an outlet port for connection to a fluid reservoir, a regulator piston reciprocably disposed within the housing to form a first fluid chamber in open communication with the first inlet and outlet ports and a second fluid chamber in open communication with the second inlet port, and a spring loaded annular valve seat member arranged within the first fluid chamber to cooperate with a valve part of the piston so as to control the fluid flow from the first inlet port to the outlet port in response to the difference in pressure between the fluid chambers. A support member is arranged within the first fluid chamber formed therein with an axial bore in which a large diameter portion of the piston is slidably disposed to form a third annular fluid chamber. The support member is further formed with an orifice for effecting the fluid flow between the first and third fluid chambers in response to axial movement of the piston.

4 Claims, 3 Drawing Figures

REGULATOR VALVE FOR HYDRAULIC ANTI-SKID APPARATUS

BACKGROUND OF THE INVENTION

1. Field of the Invention

The present invention relates to a hydraulic anti-skid system for installation in a vehicle braking circuit between a master cylinder and a wheel brake cylinder to prevent the road wheels from locking in braking operation, and more particularly to a regulator valve arranged to control a hydraulic power pressure applied to an anti-skid apparatus from a hydraulic power pressure source in response to a master cylinder pressure.

2. Discussion of the Background

Such a conventional hydraulic anti-skid apparatus as described above includes a brake pressure control piston disposed within a hydraulic braking circuit between a master cylinder and wheel brake cylinders to increase or decrease the capacity of the braking circuit in response to axial displacement of the piston, a cut-off valve disposed within the braking circuit to be closed in response to the axial displacement of the piston, a hydraulic power pressure source in the form of a fluid pump driven by a prime mover of the vehicle to apply a hydraulic power pressure to the piston, a regulator valve arranged to control the hydraulic power pressure in accordance with a master cylinder pressure from the master cylinder, and an electrically operated valve arranged to be energized in accordance with a skidding condition of the vehicle to control the power pressure applied to the piston.

In the above arrangement, the regulator valve comprises a regulator piston arranged to be applied at opposite ends thereof with the master cylinder pressure and the power pressure, and a valve seat element arranged to cooperate with a valve part of the piston so as to control the power pressure in response to axial displacement of the regulator piston. If in operation the brake pressure control piston is axially displaced to a large extent when the regulator piston is being applied with the master cylinder, there will occur a sudden change of the power pressure. This causes pulsation of the power pressure and vibration of the regulator piston, resulting in unpleasant noises being generated in the brake system.

SUMMARY OF THE INVENTION

It is, therefore, a primary object of the present invention to provide an improved regulator valve for the anti-skid apparatus capable of reliably preventing the regulator piston from vibration caused by pulsation of the power pressure.

According to the present invention, the primary object of the present invention is accomplished by providing an improved regulator valve for a hydraulic anti-skid apparatus for installation in a vehicle braking system between a master cylinder and a wheel brake cylinder, which regulator valve comprises a housing provided with a first inlet port for connection to a hydraulic power pressure source and the anti-skid apparatus, a second inlet port for connection to the master cylinder, and an outlet port for connection to a fluid reservoir; a regulator piston reciprocably disposed within an axial bore in the housing to subdivide the interior of the housing into first and second fluid chambers, the first fluid chamber being in open communication with the first inlet and outlet ports, the second fluid chamber being in open communication with the second inlet port, and the regulator piston being formed at one end thereof with a valve part exposed in the first fluid chamber; and valve seat means arranged within the first fluid chamber between the first inlet and outlet ports to cooperate with the valve part of the regulator piston so as to control the flow of fluid from the first inlet port to the outlet port in response to the difference in pressure between the first and second fluid chambers; and wherein a support member is arranged in place within the first fluid chamber and formed therein with an axial bore in which the one end portion of the regulator piston is axially slidably disposed in a fluid-tight manner to form a third annular fluid chamber, the support member being further formed with an orifice for fluid communication between the first and third fluid chambers, whereby the capacity of the third annular fluid chamber is increased or decreased in response to movement of the regulator piston to restrain vibration of the regulator piston.

BRIEF DESCRIPTION OF THE DRAWINGS

Additional objects and advantages of the present invention will become readily apparent from the following detailed description of a preferred embodiment thereof when taken together with the accompanying drawings in which.

DESCRIPTION OF THE PREFERRED EMBODIMENT

Figure 1:
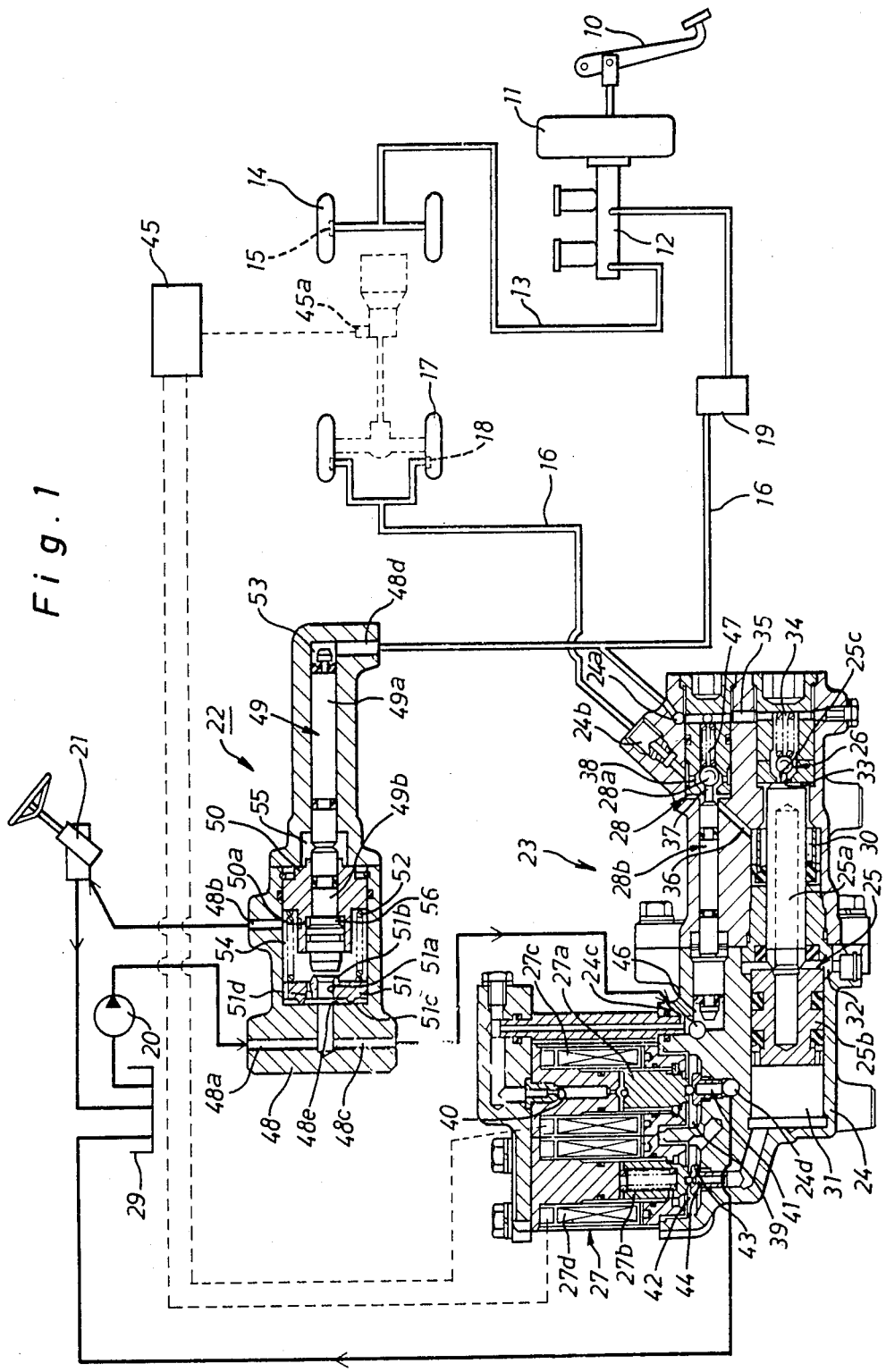
FIG. 1 is a view in longitudinal section of a regulator valve in accordance with the present invention, which is incorporated in a vehicle braking system equipped with a hydraulic anti-skid apparatus.

Referring now to the drawings, FIG. 1 illustrates a vehicle braking system in which a hydraulic anti-skid apparatus 23 is disposed within a braking circuit 16 connecting a tandem master cylinder 12 to rear wheel brake cylinders 18, 18 to prevent locking of the rear road wheels 17, 17 in braking operation and in which a regulator valve 22 is connected to the braking circuit 16 and is responsive to a master cylinder pressure from the master cylinder 12 to control a hydraulic power pressure applied to the anti-skid apparatus 23 from a fluid pump 20. The master cylinder 12 is equipped with a brake booster 11 which is arranged to be actuated by depression of a brake pedal 10, and the master cylinder 12 is directly connected to front wheel brake cylinders 15, 15 by way of a front braking circuit 13. The fluid pump 20 is arranged to be driven by a prime mover of the vehicle and is connected at its inlet port to a fluid reservoir 29 and at its outlet port to a power steering device 21 and the anti-skid apparatus 23 through the regulator valve 22. In the figure, the reference numeral 19 designates a conventional proportioning valve disposed within the brake circuit 16.

The anti-skid apparatus 23 includes a housing 24 provided with inlet ports 24a, 24c, an outlet port 24b, and a drain port 24d. The housing 24 is provided with a solenoid valve assembly 27 located thereon and with a cut-off valve 26, a bypass valve 28, and a brake pressure control piston assembly 25 located thereon. The inlet ports 24a and 24c are respectively connected to the master cylinder 12 through circuit 16 and to the regulator valve 22. The outlet port 24b is connected to the rear wheel brake cylinders 18, 18, while the drain port 24d is connected to the fluid reservoir 29. The brake pressure control piston assembly 25 is in the form of a differential piston assembly including small and large diameter pistons 25a and 25b which are in abutment with each other and reciprocable in an axial bore of housing 24. The small diameter piston 25a is exposed in a braking pressure chamber 30, while the large diameter piston 25b is exposed in a power pressure chamber 31 at its one end. The braking pressure chamber 30 is in communication with the inlet port 24a via an axial hole 33, a chamber 34 and a passage 35 and in communication with the outlet port 24b via a passage 36, an axial hole 37, and a chamber 38.

The cut-off valve 26 is located in chamber 34 and in abutment with an axial projection 25c of piston 25a under the load of a compression coil spring to normally permit the flow of fluid from inlet port 24a to chamber 30 through chamber 34 and axial hole 33. When the piston assembly 25 is displaced leftwards in the figure, the cut-off valve 26 closes the axial hole 33 to interrupt the flow of fluid from inlet port 24a to chamber 30. The solenoid valve assembly 27 includes first and second valve plungers 27a, 27b which are respectively loaded in a downward direction by a coil spring, and first and second solenoid windings 27c and 27d which are energized to move the respective valve plungers 27a, 27b upwards. During deenergization of the first solenoid winding 27c, the first valve plunger 27a is in its downward position to communicate the inlet port 24c to a chamber 39 via a passage 40 and to close a passage 41 in open communication with drain port 24d. When the first valve plunger 27a is moved upwards in response to energization of the first solenoid winding 27c, the chamber 39 is isolated from the passage 40 and connected to the drain port 24d through passage 41. During deenergization of the second solenoid winding 27d, the second valve plunger 27b is in its downward position to communicate hydraulic power pressure chamber 31 with a chamber 42 in open communication with chamber 39 via a passage 43 and to close a passage 44. When the second valve plunger 27d is moved upwards in response to energization of the second solenoid winding 27d, the chamber 42 is connected to the power pressure chamber 31 through both passages 43 and 44.

Both the solenoid windings 27c and 27d are electrically connected to a control module 45 which is connected to a wheel lock sensor 45a to produce an output signal therefrom in response to an electric signal from sensor 45a. The sensor 45a is mounted on a transmission of the vehicle to detect rotation of an output shaft of the transmission so as to produce the electric signal therefrom in response to locking of the rear road wheels 17, 17. When locking of the rear road wheels 17, 17 is detected by sensor 45a, both the solenoid windings 27c and 27d are energized by the output signal from control module 45 to activate the anti-skid apparatus 23. When it is required to further apply braking pressure to the rear wheel brake cylinders 18, 18, at least the first solenoid winding 27c is deenergized in response to disappearance of the output signal from control module 45, and subsequently the second solenoid winding 27d is selectively deenergized.

The bypass valve 28 includes a valve member 28a in the form of a ball located in the chamber 38 and loaded by a compression coil spring towards the axial hole 37.

The ball 28a is in abutment with an axial projection of a stepped piston assembly 28b which is reciprocably disposed within a stepped bore coaxial with the bypass valve 28 to form a power pressure chamber 46 in open communication with the second inlet port 24c. When the power pressure in chamber 46 is maintained at a normal level, the ball 28a closes a bypass hole 47 and opens the axial hole 37 by abutment with the axial projection of the piston assembly 28b against the spring load. If the power pressure in chamber 46 drops to a zero value due to damage to the fluid pump 20, the piston assembly 28b will be displaced leftwards by the master cylinder pressure, and the ball 28a will close the axial hole 37 and open the bypass hole 47 to permit the direct flow of fluid from inlet port 24a to outlet port 24b through chamber 38.

Figure 2:
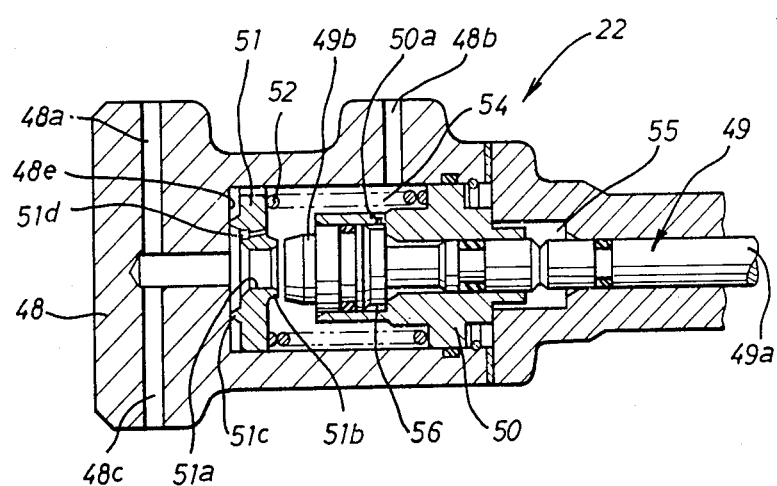
FIG. 2 is an enlarged sectional view showing a main portion of the regulator valve.

As is illustrated in FIGS. 1 and 2, the regulator valve 22 comprises a housing 48 which is provided with first and second inlet ports 48a, 48d, respectively, in connection to the fluid pump 20 and to the master cylinder 12 via circuit 16. The housing 48 is further provided with first and second outlet ports 48b, 48c, respectively, in connection to the power steering device 21 and to the inlet port 24c of anti-skid apparatus 23. Assembled within the housing 48 are a regulator piston assembly 49, a support member 50, an annular valve seat member 51 and a compression coil spring 52. The regulator piston assembly 49 includes first and second pistons 49a and 49b. The first regulator piston 49a is slidably disposed within an axial bore in the housing 48 to form a fluid chamber 53 in open communiction with the second inlet port 48d, while the second regulator piston 49b is in the form of a stepped piston slidably disposed within a stepped axial bore in the support member 50 to form a fluid chamber 54 in open communication with the first outlet port 48b. The support member 50 is arranged in a fluid-tight mannner within the housing 48 to form an air chamber 55 and is retained in place by the compression coil spring 52 engaged at its one end with the annular valve seat member 51. The annular valve seat member 51 has a central axial hole 51a and is loaded by the spring 52 leftwards in the figure. The valve seat member 51 is formed at its one end face with a first annular valve seat 51b of small diameter and at its other end face with a second annular valve seat 51c of large diameter. The first annular valve seat 51b is cooperable with a valve part of piston 49b to provide a first variable throttle, while the second annular valve seat 51c is cooperable with the inner end wall 48e of the housing 48 to provide a second variable throttle in parallel with the first variable throttle. The annular valve seat member 51 is further formed with an axial orifice 51d for effecting throttle of the fluid flow from the first inlet port 48a to the first outlet port 48b when both the first and second variable throttles are closed. The load of coil spring 52 is determined so as to restrict rightward movement of the valve seat member 51 until the hydraulic power pressure reaches a first predetermined level.

Figure 3:
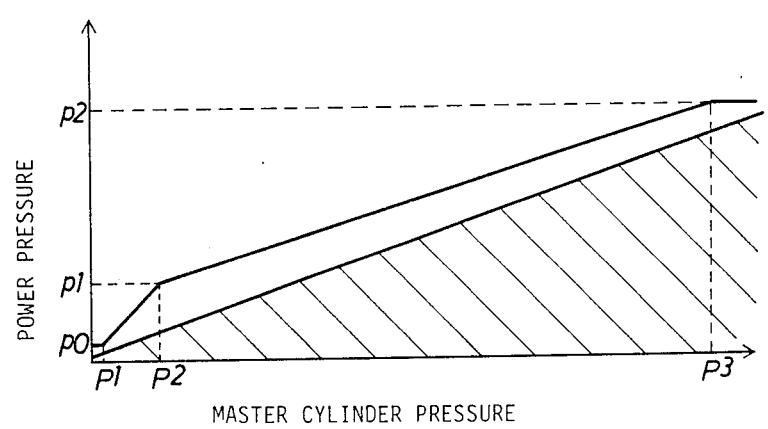
FIG. 3 is a graph illustrating the power pressure controlling characteristic of the regulator valve.

In FIG. 3 there is illustrated a hydraulic pressure controlling characteristic of the regulator valve 22 in relation to the master cylinder pressure. Under an inoperative condition of the master cylinder 12, the regulator piston assembly 49 is in its rightward stroke end due to a zero pressure value in the fluid chamber 53 such that the first variable throttle does not act to freely permit the flow of fluid from pump 20 to the power steering device 21 via inlet port 48a, the central axial hole 51a in valve seat member 51, the first variable throttle, and outlet port 48b. Thus, the hydraulic power pressure from pump 20 is maintained at a low level or a back pressure po caused by a flow resistance in the return circuit between the outlet port 48b and the fluid reservoir 29. While the master cylinder pressure increases to a first predetermined level $P_1$, the regulator piston assembly 49 is urged rightwards by the hydraulic power pressure po. Under such a condition, the force acting on piston 49b, po×$A_1$ becomes equal to the force acting on piston 49a, $P_1 \times A_2$ where $A_1$ is the left end cross-sectional area of piston 49b, and $A_2$ is the right end cross-sectional area of piston 49a.

While the master cylinder pressure further increases up to a second predetermined level $P_2$, the regulator piston assembly 49 is displaced leftwards to effect the first variable throttle between the valve part of piston 49b and the first annular valve seat 51b so as to rapidly increase the hydraulic power pressure to a predetermined level p1. Under such a condition, the ratio of the hydraulic power pressure to the master cylinder pressure is determined by $A_2/A_3$, where $A_3$ is the effective inner area of the first variable throttle, and an equation of p1 $(A_4 - A_3) = F$ is satisfied, where $A_4$ is the effective inner area of the second variable throttle between the second valve seat 51c and the inner end wall 48e of housing 48, and F is the initial load of spring 52. When the master cylinder pressure further increases up to a third predetermined level $P_3$, the valve seat member 51 displaces against the load of spring 52 and is brought into engagement with the valve part of regulator piston assembly 49 to close the first variable throttle and to effect the second variable throttle so as to maintain the hydraulic power pressure a predetermined level. Under such a condition, the ratio of the hydraulic power pressure to the master cylinder pressure is determined by $A_2/A_4$. In FIG. 3, a region indicated by cross-hatched lines represents a relationship between the hydraulic power pressure and the master cylinder pressure when the bypass valve 28 in anti-skid apparatus 23 is opened in a usual manner to effect the direct fluid flow from the master cylinder 12 to the rear wheel brake cylinders 18, 18.

In this embodiment, the regulator valve 22 is characterized in that an annular fluid chamber 56 is formed by a large diameter portion of piston 49b in the stepped axial bore of support member 50 and that a radial orifice 50a is formed in the support member 50. The radial orifice 50a is directed to the outlet port 48b to provide fluid communication between the annular fluid chamber 56 and the fluid chamber 54. In such an arrangement, the capacity of the annular fluid chamber 56 is increased in response to leftward movement of the regulator piston assembly 49 and is decreased in response to rightward movement of the regulator piston assembly 49. If in operation the brake pressure control piston assembly 25 is axially displaced to a large extent when the master cylinder pressure is being applied to the fluid chamber 53 of regulator valve 22, the regulator piston assembly 49 tends to vibrate in its axial direction due to a sudden change of the hydraulic power pressure. In this instance, the orifice 50a in support member 50 acts to throttle the flow of fluid between the fluid chambers 54 and 56. Thus, the axial vibration of the regulator piston assembly 49 is absorbed or restrained by the throttling effect of orifice 50a to prevent the occurence of unpleasant noises in the braking operation.

Having now fully set forth both structure and operation of the preferred embodiment of the concept underlying the present invention, various other embodiments as well as certain variations and modifications of the embodiment herein and described will obviously occur to those skilled in the art upon becoming familiar with said underlying concept. It is to be understood, therefore, that within the scope of the appended claims, the invention may be practiced otherwise than as specifically set forth herein. For example, the arrangement of the annular valve seat member may be modified in an appropriate manner, and the cut-off valve 26 may be arranged to be closed by another solenoid means in response to operation of the brake pressure control piston. Although in the above embodiment the anti-skid apparatus is disposed only within the rear wheel braking circuit, it may be respectively disposed within a rear wheel braking circuit connecting a tandem master cylinder to rear wheel brake cylinders and two independent front wheel braking circuits connecting the tandem master cylinder to front wheel brake cylinders.

What is claimed as new and desired to be secured by Letters Patent of the United States is:

1. A regulator valve for a hydraulic anti-skid apparatus for installation in a vehicle braking system between a master cylinder and a wheel brake cylinder, the regulator valve comprising:

a housing provided with a first inlet port for connection to a hydraulic power pressure source and said anti-skid apparatus, a second inlet port for connection to said master cylinder, and an outlet port for connection to a fluid reservoir;

a regulator piston reciprocably disposed within an axial bore in said housing to subdivide the interior of said housing into first and second fluid chambers, said first fluid chamber being in open communication with said first inlet and outlet ports, said second fluid chamber being in open communication with said second inlet port, and said regulator piston being formed at one end thereof with a valve part exposed in said first fluid chamber; and valve seat means arranged within said first fluid chamber between said first inlet and outlet ports to cooperate with the valve part of said regulator piston so as to control the flow of pressurized fluid from said first inlet port to said outlet port in response to the difference in pressure between said first and second fluid chambers;

wherein a support member is arranged in place within said first fluid chamber and formed therein with an axial bore in which the one end portion of said regulator piston is axially slidably disposed in a fluid-tight manner to form a third annular fluid chamber, said support member being further formed with an orifice for a fluid communication between said first and third fluid chambers, whereby the capacity of said third annular fluid chamber is increased or decreased in response to movement of said regulator piston to restrain vibration of said regulator piston, wherein the axial bore in said support member is in the form of a stepped bore, and said regulator piston comprises a stepped piston axially slidably disposed in a fluid-tight manner within the stepped bore in said support member and having a large diameter portion exposed in said first fluid chamber at its one end face, and wherein said third annular fluid chamber comprises an annular fluid chamber formed by a large diameter portion of said stepped piston in a large diameter portion of the stepped bore in said support member.

2. A regulator valve as claimed in claim 1, wherein the orifice of said support member is directed to said first outlet port.

3. A regulator valve as claimed in claim 1, wherein said valve seat means comprises an annular valve seat member axially slidable in said first fluid chamber, said annular valve seat member being formed at its one end face with a first annular valve seat of small diameter cooperable with the valve part of said regulator piston and at its other end face with a second annular valve seat of large diameter cooperable with the inner end wall of said first fluid chamber, and further comprising a compression coil spring interposed between said annular valve seat member and said support member to resiliently retain said support member in place and to restrict movement of said annular valve seat member towards the valve part of said regulator piston until a power pressure from said pressure source reaches a predetermined value.

4. A regulator valve as claimed in claim 3, wherein said annular valve seat member is formed with an orifice for throttling the fluid flow from said first inlet port to said first outlet port when said first and second valve seats are respectively engaged with the valve part of said regulator piston and the inner end wall of said first fluid chamber.

* * * * *